United States Patent

[11] 3,619,657

[72] Inventor Henry Naubereit
 Brown's Mill, N.J.
[21] Appl. No. 812,936
[22] Filed Apr. 2, 1969
[23] Division of Ser. No. 710,702, Feb. 27, 1968
[45] Patented Nov. 9, 1971
[73] Assignee The United States of America as represented by the Secretary of the Navy

[54] POWER CONTROL SWITCH
 1 Claim, 1 Drawing Fig.
[52] U.S. Cl............................................ 307/255,
  307/247, 307/296
[51] Int. Cl........................................... H03k 17/00
[50] Field of Search........................................ 307/296,
  255, 247, 244; 325/492, 22, 185

[56] References Cited
UNITED STATES PATENTS
| | | | |
|---|---|---|---|
| 3,169,221 | 2/1965 | Franchi | 325/152 X |
| 3,215,946 | 11/1965 | Likel | 307/255 |
| 3,397,401 | 8/1968 | Winterbottom | 325/22 |
| 3,474,405 | 10/1969 | Padberg, Jr. | 325/113 |
| 3,517,316 | 6/1970 | Anderson et al. | 325/113 |
| 3,153,729 | 10/1964 | Leakey | 307/247 |

Primary Examiner—Donald D. Forrer
Assistant Examiner—B. P. Davis
Attorneys—E. J. Brower and Henry Hansen ABSTRACT: A switching network inhibiting the flow of current from a power supply to a load until the receipt of an actuating signal at the set terminal of a flip-flop within the switching network. The flow of current continues until the actuating signal is removed, an inhibiting signal is received at the reset terminal of the flip-flop and a predetermined fixed period of time has lapsed after receipt of the inhibiting signal.

PATENTED NOV 9 1971
3,619,657
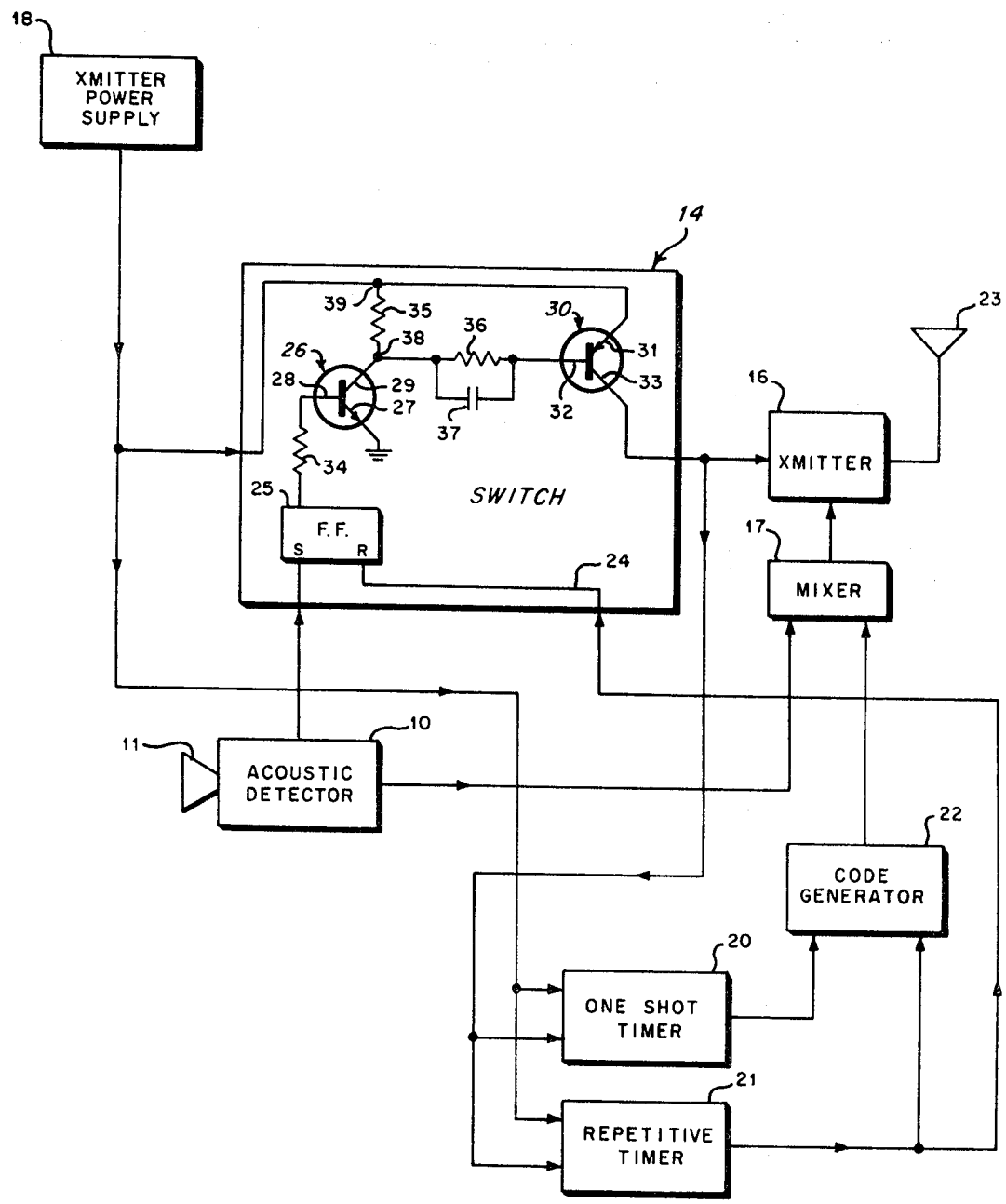
INVENTOR.
HENRY NAUBEREIT
BY  [signature]
ATTORNEY

POWER CONTROL SWITCH

This application is a division of application Ser. No. 710,702 filed Feb. 27, 1968.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates to switching circuits and more particularly to a switching network for conducting power only when predetermined criteria is met and for continuing to conduct power until a second criteria is met.

The present invention is contemplated for use as part of a device that functions as an electronic spy to listen for and activate means for transmitting signals indicative of vehicle and/or troop movements as well as button bomb detonations, rifle fire, and the like. The device may be secreted behind enemy lines and, once so secreted, may be unrecoverable. Consequently, it is paramount that transmission be kept at a minimum to both conserve power and avoid detection by the enemy. It is also paramount that information, when transmitted, may reasonably be assumed to contain desired information rather than mere random noise. In addition, as it is contemplated that a plurality of devices comprising the invention will be deployed in a predetermined pattern over a wide area, it is important that the listener know which one (or ones) of the devices is transmitting.

SUMMARY OF THE INVENTION

Accordingly, it is the general purpose of this invention to provide a switching network capable of conducting power at times when useful information needs to be transmitted by the overall system and capable of supplying power for a predetermined interval of time afterward so that timing signals may be supplied after the useful information has subsided.

The switching network used to accomplish this function inhibits a power supply until the receipt of a signal to the set input of a flip-flop. Conduction through the switching network then takes place until the flip-flop receives a reset signal in the absence of a set signal. On this occurrence a time delay keeps the switch closed until a predetermined interval has passed. In effect, the switching mechanism has two built in time delays on removal of a signal to the set input of the flip-flop. One is that the signal to the reset terminal need not occur instantaneously. On receipt of the signal at the reset terminal a second time delay takes place in order to permit power to be conducted to a load for a predetermined time afterward.

BRIEF DESCRIPTION OF THE DRAWING

The figure is a block diagram of the system showing the
The figure is a schematic block diagram of the system showing the various elements thereof in accordance with the invention.

DESCRIPTION OF THE PREFERRED EMBODIMENT

Referring now to the drawing and more particularly to the FIG., there is shown an adaptive acoustic detector 10 in accordance with and more fully explained in patent application, Ser. No. 679,255, entitled, "Adaptive Acoustic Detector Apparatus" by Henry Naubereit et al., filed Oct. 30, 1967, having at its input an acoustic sensor 11, which may be a microphone. A first output from detector 10 is fed to a transmitter 16 through a mixer 17. As disclosed in the above-mentioned patent application, the detector 10 provides a second output signal only when the signal received by sensor 11 contains desired information, such as the sound of vehicle movement. Should no such second signal be provided, switch 14, connected to the transmitter power supply 18, is nonoperative. Thus, while the transmitter 16 continuously receives information from detector 10 through mixer 17, the absence of the second signal from detector 10 prevents the closure of the switch 14 and hence precludes the transmitter power supply 18 from supplying its DC power to the transmitter 16. In this way, transmitter power is conserved, no power being consumed by the system in the standby mode. That is, power is consumed only upon the enabling of switch 14, a condition which occurs only upon the receipt and detection of desired information by adaptive acoustic detector 10.

The switch 14, in addition to being electrically connected to the transmitter power supply 18, is also electrically connected to two timing elements, a one-shot timer 20 and a repetitive timer 21. The outputs of one-shot timer 20 and repetitive timer 21 are connected to a code generator 22 which, in response to signals received from the timers provides a signal to mixer 17 and thence to transmitter 16. The mixer 17 is of the type that will pass information from background detector 10 in the absence of a coded signature signal from code generator 22 and will pass the sum of the two signals in the presence of a coded signature signal. Both coded and encoded information is radiated by antenna 23.

The operation of the system of the FIG. will now be described. As stated heretofore, if the detector 10 does not provide the second output signal, then even though detector 10 is providing the first signal to transmitter 16, the power supply 18 thereof is inoperative to supply power due to the "off" condition of switch 14 and hence no signal is radiated by antenna 23. If, however, the detector 10 does supply the second signal, the switch 14 is rendered operative to thereby permit the passage of voltage from transmitter power supply 18 to the transmitter 16. Concurrently therewith, the supply 18 provides DC voltage to both the one-shot timer 20 and the repetitive timer 21 through an electrical connection. One-shot timer 20 is designed to provide a pulse 3.0 seconds after the closure of switch 14. This pulse is fed into the code generator 22 which, in response thereto, provides a coded signal to mixer 17. If the information (first signal) from the adaptive acoustic detector 10 persists for a period greater than 3 seconds, the signature signal from code generator 22 mixes therewith in mixer 17 and the composite signal is supplied to transmitter 16 for radiation by antenna 23. Conversely, if the first signal from the detector 10 persists for less than 3 seconds, the signature signal from code generator 22 will be passed by the mixer 17 directly to the transmitter 16 for radiation thereby.

It is noted that regardless of the duration of the first signal from detector 10, or the duration of the second signal from the detector 10, the switch 14 remains operative, once so rendered, until it receives a reset pulse via line 24 from repetitive timer 21. This will be hereinafter described.

The transmitter power supply 18 also feeds the repetitive timer through an electrical conductor. Repetitive timer 21 is designed to provide an output signal 10.0 seconds after the receipt of power from the supply 18. The signal from repetitive timer 21 is fed concurrently to the code generator 22 and, via electrical conductor 24, back to switch 14. The code generator, in response to the signal received from the repetitive timer 21, provides a signal to the mixer 17 in the same fashion as provided upon receipt of a signal from one-shot timer 20. The signal from the code generator 22, in response to the signal produced by repetitive timer 21, is radiated by the antenna 23 either as part of a composite signal or as merely the code signal itself in a manner identical with the radiation of the signal from one-shot timer 20 and the first output signal from detector 10.

The signature signal from code generator 22, in response to repetitive timer 21, occurs 7.0 seconds after the signature signal responsive to the signal supplied by one-shot timer 20. If, for example, a line of troops passes by the sensor 11 in a period between 3.0 and 10.0 seconds, then the first signature signal from code generator 22 will mix with the first signal supplied by detector 10 and a composite signal will be radiated by antenna 23. The signature signal supplied as a result of the receipt of a signal from repetitive timer 21, however, will not mix in the mixer 17 and will instead be directly radiated by antenna 23. In this way the listener knows not only which of the strategically positioned devices is transmitting (as identified by the particular code signal transmitted) but also the length of time, within rather narrow limits, that a desired target is within the range of the sensor 11.

Once the switch 14 is closed, the transmitter remains "ON" until the power supply 18 is disconnected therefrom by the disabling of switch 14. The reset pulse provided at 10 second intervals by the repetitive timer 21 via line 24 attempts to reset or disable the switch 14 once every 10 seconds. However, the switch 14 is of a type such that it can not be reset in the presence of the second signal from the detector 10. Thus, as long as the sensor 11 of FIG. 1 is receiving a desired target signal, the transmitter 16 will remain ON. Upon the occurrence of the absence of a desired signal at sensor 11, however, the transmitter 16 remains ON for the conclusion of the 10 second cycle where upon, the detector 10 no longer providing a second signal to switch 14, the reset pulse from the timer 21 is operative to disable the switch 14 and thereby disconnect the power supply 18 from the transmitter 16.

It is noted that the switch 14 is provided with a time-delay circuit of sufficient duration to insure that the signature signal from code generator 22 (as derived from repetitive timer 21) will be radiated by the antenna 23 prior to the disabling of the switch 14 upon receipt of a reset pulse.

Referring now to the switch 14 comprising a conventional flip-flop 25 having set S and reset R inputs; an NPN transistor 26 having an emitter 27, a base 28 and a collector 29; and a PNP transistor 30 having an emitter 31; a base 32; and a collector 33. The output from flip-flop 25 is connected to the base 28 through a resistor 34. The emitter 27 is grounded while the collector 29 is connected to the transmitter power supply 18 through a resistor 35. Collector 29 is also connected both to the emitter 31 and base 32 of the transistor 30, the latter connection being through a time delay network comprising the parallel combination of a resistor 36 and a capacitor 37 and joined at point 38 on the collector 29. As can be seen from the figure, the collector 33 of transistor 30 provides an output signal concurrently to the transmitter 16 and to the two timers 20 and 21. The operation of switch 14, will now be described.

DC voltage from the transmitter power supply 18 is applied to one side of the resistor 35 and to the emitter of transistor 30. However, neither transistor 30 nor transistor 26 is rendered conductive as no voltage is supplied to the respective bases 32 and 28 of the two transistors. In this condition, the system is in the standby mode. Upon the receipt of a signal at the set S input of flip-flop 15, supplied by the detector 10, the flip-flop 25 provides an output signal which results in a positive voltage being developed across resistor 34. This positive potential at the base 28 of transistor 26 supplies the initial base current for the transistor 26 and, as the base 28 is now more positive than the emitter 27, the transistor 26 is rendered conductive. Upon conduction being achieved, power from transmitter power supply 18 flows through the resistor 35, through the transistor 26, and to ground through emitter 27. As power flows through the resistor 35 and a voltage develops thereacross, the voltage at point 38 decreases with respect to the voltage at a point 39 on the other side of resistor 35. Consequently, the base 32 of PNP transistor 30 is rendered more negative than the emitter 31 thereof with the result that the transistor 30 is rendered conductive to supply power from power supply 18 through its collector 33 to the transmitter 16, one-shot timer 20, and repetitive timer 21. The time delay network comprising resistor 36 and capacitor 37 delays the transmission of power from the point 38 to the base 32 of the transistor 30 for a period of time sufficient to allow the code generator 22 to provide a signal to the mixer 17 prior to the disabling of switch 14 upon the application of a reset terminal R from repetitive timer 21.

The switch 14 is not disabled, however, so long as a signal is present at the set S input of flip-flop 25. Upon the occurrence of the absence of such a signal, the reset pulse is operative to open the switch 14 and thereby disengages the transmitter 16 from its power supply 18.

Obviously many modifications and variations of the present invention are possible in the light of the above teachings. It is therefore to be understood that within the scope of the appended claims the invention may be practiced otherwise than as specifically described.

I claim:

1. An electrical switch which consumes no power in the standby mode comprising:
   a flip-flop formed to receive set and reset signals for providing a first signal;
   a first resistor connected at one terminal to receive said first signal;
   a second resistor formed to receive at one terminal a second signal;
   an NPN transistor with the base electrode connected to the other terminal of said first resistor, the collector electrode connected to the other terminal of said second resistor and the emitter electrode grounded;
   a time delay circuit including a resistor and capacitor connected in parallel with one terminal connected to said NPN transistor collector electrode; and
   a PNP transistor with the base electrode connected to the other terminal of said parallel connection of said resistor and said capacitor, the emitter electrode formed to receive said second signal and said collector electrode formed to provide an output signal.

* * * * *